United States Patent [19]
Nalband

[11] 3,942,230
[45] Mar. 9, 1976

[54] COMPOSITE METALLIC ROLL WITH RELEASE SURFACE AND METHOD OF MAKING SAME

[75] Inventor: Thomas E. Nalband, Cheshire, Conn.

[73] Assignee: Plasma Coatings, Inc., Cheshire, Conn.

[22] Filed: Mar. 5, 1974

[21] Appl. No.: 448,340

[52] U.S. Cl. ........... 29/132; 29/148.4 D; 100/155 R; 432/60; 427/34; 427/405; 427/409; 427/423
[51] Int. Cl.² ........................................ B21B 31/08
[58] Field of Search ......... 117/46 FS, 71 M, 75, 94; 29/130, 132, 148.4 D; 100/93 RP, 155; 427/34, 405, 409, 423; 428/461, 462, 906; 432/60

[56] References Cited
UNITED STATES PATENTS

| | | | |
|---|---|---|---|
| 3,271,653 | 9/1966 | Wolf | 117/75 X |
| 3,419,414 | 12/1968 | Marks | 117/75 X |
| 3,437,032 | 4/1969 | Manghirmalani et al. | 117/94 X |
| 3,773,544 | 11/1973 | Newton et al. | 117/75 X |
| 3,776,760 | 12/1973 | Baker et al. | 117/94 X |

*Primary Examiner*—Michael R. Lusignan
*Attorney, Agent, or Firm*—McCormick, Paulding & Huber

[57] ABSTRACT

A composite metallic roll or other member comprising a body member of a base metal, a porous plasma flame spray plate of a nickel chromium alloy, and a continuous film of a Teflon deposited over said plate and impregnating the same for gradual exposure over a predetermined life. The corresponding method comprises the steps of applying the plasma flame spray plate with a porous finish and a subsequent application of a thin uniform deposit of a Teflon (tetraflouroethylene). The Teflon is thereupon heated to and is above its fusion temperature whereby to provide an impregnate film for gradual exposure over a predetermined life.

12 Claims, 2 Drawing Figures

COMPOSITE METALLIC ROLL WITH RELEASE SURFACE AND METHOD OF MAKING SAME

BACKGROUND OF THE INVENTION

Composite metallic rolls with release surfaces have been provided in the past and have conventionally included a fluorocarbon polymer film over a metallic plate. Such rolls have not, however, been wholly satisfactory in high temperature use as in the 400°–500°F. range. Such conditions of use are encountered in the manufacture of paper and in other industries.

SUMMARY OF THE INVENTION

It is the general object of the present invention to provide a composite metallic roll or other member with an abrasive resistant release surface with capability for operation at high temperatures in the 400°–500°F. range and with enhanced life under such conditions of use.

DESCRIPTION OF PREFERRED EMBODIMENT

Figure 1:
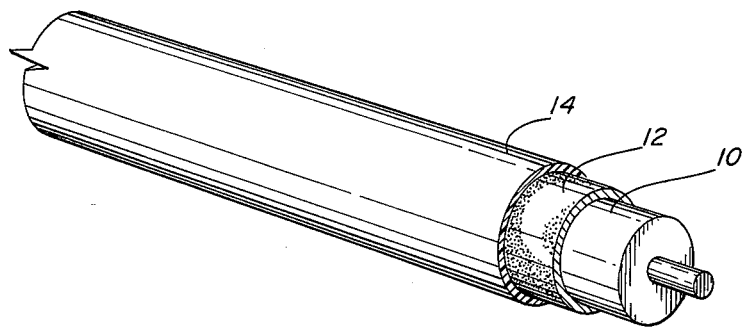
FIG. 1 is a perspective view partially broken away showing a composite metallic roll of the present invention.
Figure 2:
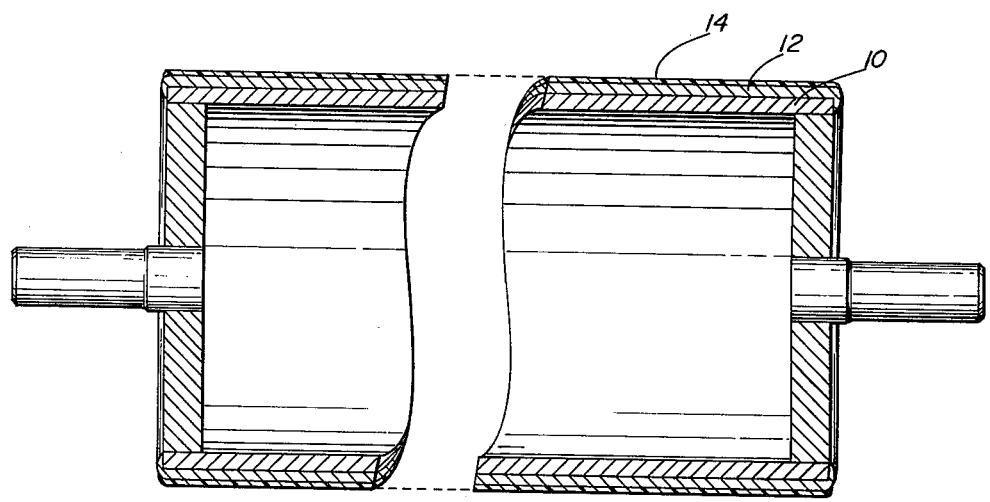
FIG. 2 is an enlarged cross sectional view of the composite roll.

In accordance with the present invention, a composite metallic roll or other member having a body member 10 is provided initially with a porous plating 12 in a flame spraying process. The flame spray process may be of the older and well-known wire type, or preferably, a plasma flame spraying process is employed. The material of the plate may vary widely within the scope of the invention, but such material is preferably from the group comprising stainless steel, nickel, nickel chromium, molybdenum, the carbides and ceramics. In a presently preferred embodiment of the invention a nickel chromium alloy is employed with a number Fifteen powder, Nitrogen and a G.E. spray nozzle. A single pass application is accomplished and the nickel chromium alloy is deposited to a depth of 0.002 to 0.003 inches. An extremely hard condition is achieved with a 40–60 $R_c$ hardness. Grit blasting is preferably employed as a preliminary step for cleaning and to provide a slightly porous pattern for good bonding. The resulting plate 12 has a porosity suitable for the impregnation thereof by a fluorocarbon polymer.

Further and in accordance with the invention, a fluorocarbon polymer 14 is deposited over the plasma frame spray plate 12 and the fluorocarbon may be from the group comprising tetrafluoroethylene, hexafluoropropylene, monochlorotrifluoroethylene, and tetrafluoroethylene-hexafluoropropylene. Preferably a Teflon (tetrafluoroethylene) is employed and is sprayed over the plate with a prime coat 1 ½ mills. gross per square foot. A top coat 10 ½ mills. per square foot is thereafter applied and a heating step for fusion of the fluorocarbon polymer is carried out resulting in a considerable reduction in the thickness of the polymer and in impregnation of the underlying plasma flame spray plate.

In an illustrative embodiment of the invention the entire roll is oven-heated with an oven preheat to approximately 300°F. The roll is allowed to remain in the oven for approximately 20 minutes and is thereafter staged to approximately 500°F. Subsequently, the roll is heated to the 700°–750° range and, more particularly, to a 725°–735°F. range. The roll is held in the oven for approximately 20 minutes and is thereafter removed with the Teflon in a thin substantially uniform film thereon and impregnating the underlying plate.

An optional intermediate step in the presently preferred method may involve a light grit blasting of the metallic roll subsequent to plating and prior to the application of the Teflon. Excess oxide is thus removed from the roll but the roll is thereafter placed in the oven for a light uniform oxidation for better bonding of the Teflon.

In use, the composite metallic rolls or other members tend to gradually expose or release Teflon over a predetermined life whereby to provide excellent release properties. Desirably high abrasion resistance and hardness levels are achieved and the rolls are well adapted to continuous operation in the temperature ranges mentioned above i.e., 400°–500°F.

I claim:

1. A composite metallic roll or the like comprising a body member, a porous plate to a depth of 0.002 to 0.003 of an inch and comprising stainless steel, nickel, nickel chromium, molybdenum, a carbide, or a ceramic flame sprayed over the body member, and a continuous film of a fluorocarbon polymer impregnated into said porous plate for a gradual exposure over a predetermined life, said fluorocarbon polymer comprising tetrafluoroethylene, hexafluoropropylene, monochlorotrifluoroethylene, or tetrafluoroethylene-hexafluoropropylene.

2. A composite metallic roll or the like as set forth in claim 1 wherein said flame spray plate takes the form of a wire flame spray plate.

3. A composite metallic roll or the like as set forth in claim 1 wherein said flame spray plate takes the form of a plasma flame spray plate.

4. A composite metallic roll or the like as set forth in claim 3 wherein said plasma flame spray plate takes the form of a nickel chromium alloy.

5. A composite metallic roll or the like as set forth in claim 4 wherein said fluorocarbon polymer takes the form of tetrafluoroethylene.

6. A method of making a composite metallic roll or the like comprising the steps of providing a body member, applying a porous plating to a depth of 0.002 to 0.003 inches to said body in a flame spraying process, said plating comprising stainless steel, nickel, nickel chromium, molybdenum, a carbide, or a ceramic, and applying a thin uniform deposit of a fluorocarbon polymer comprising tetrafluoroethylene, hexafluoropropylene, monochlorotrifluoroethylene, or tetrafluoroethylene-hexafluoropropylene, and heating said deposit to a level above the fusion temperature of the fluorocarbon polymer whereby to provide an impregnant film for gradual exposure over a predetermined life.

7. A method of making a composite metallic roll or the like as set forth in claim 6 wherein said flame spraying process is of the wire type.

8. A method of making a composite metallic roll or the like as set forth in claim 6 wherein said flame spraying process is of the plasma type.

9. A method of making a composite metallic roll or the like as set forth in claim 8 wherein said plasma flame spraying process employs a nickel chromium alloy.

10. A method of making a composite metallic roll or the like as set forth in claim 6 wherein said fluorocarbon polymer takes the form of tetrafluoroethylene.

11. A method of making a composite metallic roll or the like as set forth in claim 10 wherein said step of heating takes the form of oven heating a metallic roll or other member to a temperature in the range of 700° to 750°F. for a time period in the range 15 to 25 minutes.

12. A method of making a composite metallic roll or the like as set forth in claim 11 wherein said temperature falls in the range 725° to 735° and said time period is approximately 20 minutes.

* * * * *